US011762120B2

(12) United States Patent
Forgang et al.

(10) Patent No.: US 11,762,120 B2
(45) Date of Patent: Sep. 19, 2023

(54) POWER-EFFICIENT TRANSIENT ELECTROMAGNETIC EVALUATION SYSTEM AND METHOD

(71) Applicant: Baker Hughes, Houston, TX (US)

(72) Inventors: Stanislav Forgang, Houston, TX (US); Babak Kouchmeshky, Houston, TX (US); Sushant Dutta, Houston, TX (US); Randy Gold, Houston, TX (US)

(73) Assignee: Baker Hughes Holdings LLC, Houston, TX (US)

(*) Notice: Subject to any disclaimer, the term of this patent is extended or adjusted under 35 U.S.C. 154(b) by 0 days.

(21) Appl. No.: 17/020,419

(22) Filed: Sep. 14, 2020

(65) Prior Publication Data
US 2020/0408947 A1 Dec. 31, 2020

Related U.S. Application Data

(63) Continuation-in-part of application No. 16/204,626, filed on Nov. 29, 2018, now abandoned.

(51) Int. Cl.
G01V 3/28 (2006.01)
E21B 49/00 (2006.01)
G01V 3/30 (2006.01)

(52) U.S. Cl.
CPC .............. *G01V 3/28* (2013.01); *E21B 49/00* (2013.01); *G01V 3/30* (2013.01)

(58) Field of Classification Search
CPC ............. G01V 3/28; G01V 3/30; E21B 49/00
See application file for complete search history.

(56) References Cited

U.S. PATENT DOCUMENTS 3,449,662 A * 6/1969 Wood ................. G01N 27/902
324/220
3,617,867 A * 11/1971 Herzog ................. G01V 3/32
324/303
(Continued)

FOREIGN PATENT DOCUMENTS

CA 2925789 C * 5/2018 ............. E21B 47/18
CN 108474249 A * 8/2018 ............... G01V 3/38
(Continued)

OTHER PUBLICATIONS

International Search Report and Written Opinion dated Feb. 6, 2020 in International Application No. PCT/US19/63295.
(Continued)

Primary Examiner — Patrick Assouad
Assistant Examiner — Demetrius R Pretlow
(74) Attorney, Agent, or Firm — HOGAN LOVELLS US LLP

(57) ABSTRACT

A system for performing downhole logging operations includes a conductor coil configured to alternate between producing a magnetic field and measuring a magnetic field induced in a formation, a power supply couplable to the conductor coil for providing an electrical control current to conductor coil, and a signal acquisition system couplable to the conductor coil. The system further includes a permanent magnet coupled to the conductor coil, and a multi-state switch operable in a first state and a second state. In the first state, the conductor coil is coupled to an output of the power supply and decoupled from an input of the signal acquisition system. In the second state, the conductor coil is coupled to the input of acquisition electronics and decoupled from the output of the power supply.

19 Claims, 6 Drawing Sheets

(56) References Cited

U.S. PATENT DOCUMENTS

| | | | | |
|---|---|---|---|---|
| 3,964,553 | A | * | 6/1976 | Basham ................ E21B 43/119 |
| | | | | 175/4.51 |
| 5,283,520 | A | | 2/1994 | Martin |
| 5,332,967 | A | * | 7/1994 | Shporer ............... G01R 33/341 |
| | | | | 324/300 |
| 5,426,367 | A | | 6/1995 | Martin |
| 5,914,596 | A | * | 6/1999 | Weinbaum ........... G01N 29/225 |
| | | | | 324/228 |
| 6,081,116 | A | * | 6/2000 | Wu ...................... G01N 24/081 |
| | | | | 324/303 |
| 6,121,773 | A | * | 9/2000 | Taicher ................... G01V 3/32 |
| | | | | 324/303 |
| 6,163,151 | A | * | 12/2000 | Wisler ................. G01N 24/081 |
| | | | | 324/303 |
| 8,432,167 | B2 | | 4/2013 | Reiderman |
| 9,903,197 | B2 | | 2/2018 | Prammer |
| 2001/0043509 | A1 | * | 11/2001 | Green .................... E21B 47/18 |
| | | | | 367/81 |
| 2003/0117134 | A1 | * | 6/2003 | Almaguer ............. G01N 27/82 |
| | | | | 324/221 |
| 2003/0155131 | A1 | | 8/2003 | Vick |
| 2004/0174166 | A1 | * | 9/2004 | Wisler .................... G01V 3/32 |
| | | | | 324/303 |
| 2006/0202699 | A1 | | 9/2006 | Reiderman |
| 2007/0222444 | A1 | * | 9/2007 | Reiderman .............. G01V 3/32 |
| | | | | 324/303 |
| 2008/0012569 | A1 | | 1/2008 | Hall |
| 2008/0018334 | A1 | * | 1/2008 | Reiderman ........ G01R 33/3808 |
| | | | | 324/346 |
| 2009/0102478 | A1 | * | 4/2009 | Reiderman ........... H01F 7/0278 |
| | | | | 324/303 |
| 2009/0193889 | A1 | * | 8/2009 | Waid ...................... G01N 9/002 |
| | | | | 73/32 A |
| 2011/0080060 | A1 | | 4/2011 | Camacho |
| 2011/0198078 | A1 | * | 8/2011 | Harrigan ............... E21B 49/087 |
| | | | | 166/254.2 |
| 2013/0057287 | A1 | * | 3/2013 | Le ........................... G01V 3/32 |
| | | | | 324/346 |
| 2013/0193953 | A1 | | 8/2013 | Yarbro |
| 2013/0333872 | A1 | * | 12/2013 | Mcmillon ................ H01F 7/04 |
| | | | | 166/66.5 |
| 2013/0335091 | A1 | * | 12/2013 | Morris ..................... G01V 3/28 |
| | | | | 324/333 |
| 2014/0084927 | A1 | * | 3/2014 | Walsh ...................... G01V 3/14 |
| | | | | 324/319 |
| 2014/0111210 | A1 | * | 4/2014 | Fang ..................... E21B 47/022 |
| | | | | 324/346 |
| 2016/0138391 | A1 | * | 5/2016 | Logan ..................... E21B 47/24 |
| | | | | 367/85 |
| 2016/0194951 | A1 | * | 7/2016 | Hay ....................... E21B 44/005 |
| | | | | 175/24 |
| 2016/0245779 | A1 | * | 8/2016 | Khalaj Amineh ...... G01N 27/82 |
| 2016/0320769 | A1 | * | 11/2016 | Deffenbaugh .......... E21B 47/26 |
| 2017/0058662 | A1 | * | 3/2017 | Blount .................. E21B 47/092 |
| 2017/0178779 | A1 | * | 6/2017 | Maisch ............... F01L 13/0036 |
| 2018/0147679 | A1 | | 5/2018 | Leal |
| 2018/0245424 | A1 | * | 8/2018 | Stokley ................... E21B 33/16 |
| 2018/0371896 | A1 | * | 12/2018 | Wiecek ................. E21B 47/135 |

FOREIGN PATENT DOCUMENTS

| | | | | |
|---|---|---|---|---|
| DE | 4338752 C2 | * | 8/1995 | ........... G01N 27/902 |
| DE | 10318482 B3 | * | 10/2004 | .............. G01P 3/505 |
| FR | 2822233 A1 | * | 9/2002 | .............. G01V 11/00 |
| GB | 2405213 A | * | 2/2005 | ............. G01N 27/82 |
| RU | 2382357 C1 | * | 2/2010 | |
| SU | 883376 A1 | * | 11/1981 | |
| WO | WO-2014093096 A1 | * | 6/2014 | ........... E21B 47/092 |

OTHER PUBLICATIONS

International Search Report and Written Opinion dated Nov. 16, 2021 in corresponding PCT Application No. PCT/US21/43990.

* cited by examiner

POWER-EFFICIENT TRANSIENT ELECTROMAGNETIC EVALUATION SYSTEM AND METHOD

CROSS REFERENCE TO RELATED APPLICATIONS

This application is a continuation-in-part of U.S. patent application Ser. No. 16/204,626, titled "POWER-EFFICIENT TRANSIENT ELECTROMAGNETIC EVALUATION SYSTEM AND METHOD," filed Nov. 29, 2018, the full disclosures of which is hereby incorporated by reference in its entirety for all purposes.

BACKGROUND

1. Field of Invention

This disclosure relates in general to oil and gas tools, and in particular, to power-efficient systems and methods for performing transient electromagnetic well evaluation.

2. Description of the Prior Art

During oil and gas operations, various measurement may be conducted downhole in order to evaluate one or more formation properties. In some applications, transient electromagnetic technology may be used to measure electrical properties of the formation. In conventional transient electromagnetic technology, an electromagnet with switchable polarity is used to induce transient magnetic fields in the surrounding formation. A constant current is continuously applied to the electromagnet for a relatively long period of time to maintain its magnetization, and then the current is abruptly switched off or the polarity of the current is reversed. The electromagnet is then maintained in the switched off state or in the reversed polarity state for a period of time long enough to obtain desired properties of investigated medium. The electromagnet may then be turned on again or polarity switched again and maintained unchanged until the next switching occurs. The electromagnet may be continuously switched back and forth during a measurement operation. The abrupt switching of the electromagnet, either between on/off states or polarities, results in corresponding abrupt switching of the corresponding magnetic field interacting with the investigated formation. This time-varying magnetic field of electromagnet generates a transient electromotive force in the formation which, in turn, produces eddy currents in the formation. The eddy currents induce their own magnetic signal that can be measured and processed for obtaining information about the electrical properties of the formation.

The eddy currents induced in the formation by the abrupt electromagnet switching begin to decay after the switching occurs and the rate of this decay depends on the electromagnetic properties of the formation. The decaying eddy currents produce a corresponding magnetic field, which can be measured by a receiver. The output of the receiver thus contains information of the formation electromagnetic properties. During this measurement phase, the current applied to the electromagnet remains shut off or unreversed as the formation is responding to every change in this current, which may convolute the measured data if left uncontrolled. Thus, in conventional transient electromagnetic technology, in order to establish a condition in which the measured data is accurate and robust, a constant current is continuously applied to the electromagnet for a relatively long time, which results in high power consumption. For example, when a conventional polarity switching is used, a current is applied for substantially 100% of operation time. Even in the case of on/off switching, the current is applied for substantially at least 50% of the time.

SUMMARY

Applicant recognized the problems noted above and conceived and developed embodiments of systems and methods for power-efficient transient electromagnetic well logging.

In an example embodiment, a system for performing downhole logging operations includes a conductor coil configured to alternate between producing a magnetic field and measuring a magnetic field induced in a formation, a power supply couplable to the conductor coil for providing an electrical control current to conductor coil, and a signal acquisition system couplable to the conductor coil. The system further includes a permanent magnet coupled to the conductor coil, and a multi-state switch operable in a first state and a second state. In the first state, the conductor coil is coupled to an output of the power supply and decoupled from an input of the signal acquisition system. In the second state, the conductor coil is coupled to the input of acquisition electronics and decoupled from the output of the power supply. The system may include at least one additional electromagnetic sensor detecting an electromagnetic signal caused by eddy currents in the surrounding environment induced by the transient magnetic field. Some such embodiments further include a timer coupled to the multi-state switch, the timer activating the multi-state switch to change the states based on a programmed activation rate or a control signal. A control current supplied to the conductor coil from the power supply during the first state of multi-state switch has an amplitude large enough to generate a magnetic field exceeding the permanent magnet's existing magnetization. A duration of the first state of the multi-state switch and the corresponding control current flowing through the conductive coil is shorter than a duration of the second state during which the control current is absent. The control current supplied to the conductor coil from the power supply during the first state of the multi-state switch causes the permanent magnet to reverse polarity and induces the transient magnetic field in the surrounding environment. The flow of the control current supplied to the conductor coil from the power supply has an opposite direction of flow during each sequential time the multi-state switch is in the first state, thereby sequentially reversing polarity of the permanent magnet. Switching the multi-state switch to the second state upon completion of the first state enables the conductor coil to operate as a magnetic field sensor that records induced voltage by the means of the signal acquisition system. The at least one additional electromagnetic sensor comprises at least one of a magnetometer, a second conductive coil, an electrode system, a Hall effect sensor, or a giant magnetic resistivity sensor. In some embodiments, the system further includes one or more sensors located around the circumference of a pipe under inspection, in which the pipe is magnetized by the permanent magnet and the one or more sensors detect magnetic flux leakage from the pipe. The permanent magnet has a magnetization strength below the magnetic saturation of a structure in the surrounding environment. The permanent magnet has a magnetization strength exceeding the magnetic saturation of a first structure in a surrounding environment and below the magnetic saturation of a second structure in the surrounding environment.

In accordance with another example embodiment, a system for performing downhole logging operations includes a conductor coil, a permanent magnet coupled to the conductor coil, a power supply selectively couplable to the conductor coil for providing a current to conductor coil, a signal acquisition system selectively couplable to the conductor coil for receiving a measurement signal from the conductor coil, and a switching device configured to alternating couple the conductor coil to either the power supply or the signal acquisition system. When the conductor coil is coupled to the power supply, the power supply provides a current through the conductor coil causing the conductor coil to generate a magnetic field. When the conductor coil is coupled to the signal acquisition system, the conductor coil detects a magnetic field induced in a formation. The system may further include a timer coupled to the switching device, the timer controlling the switching device based on a programmed activation rate or a control signal. The conductive coil is coupled to the power supply for a shorter duration than the conductive coil is coupled to the signal acquisition system. The flow current supplied to the conductor coil from the power supply has an opposite direction of flow during each sequential time the conductive coil is coupled to the power supple, thereby sequentially reversing polarity of the permanent magnet. The system may further include one or more sensors located around the circumference of a pipe under inspection, in which the pipe is magnetized by the permanent magnet and the one or more sensors detect magnetic flux leakage from the pipe.

In yet another embodiment, a method for evaluating a well includes placing an evaluation tool in a wellbore surrounded by a well formation, the evaluation tool including a permanent magnet, a conductor coil, a power supply, and a signal acquisition system. The method also includes electrically coupling the conductor coil to the power supply, thereby energizing the conductor coil and reversing the polarity of the permanent magnet and generating a transient magnetic field in the well formation. The method also includes electrically decoupling the conductor coil from the power supply, electrically coupling the conductor coil to the signal acquisition system, the conductor coil sensing an electromagnetic signal caused by eddy currents in the formation induced by the transient magnetic field, electrically decoupling the conductor coil from the signal acquisition system, and electrically coupling the conductor coil to the power supply. The method may further include controlling switching between coupling the conductor coil to the power supply and the signal acquisition system using a timer programmed based on a predetermined switching schedule. The signal acquisition system is coupled to the conductor coil for a longer duration than the power supply is coupled to the conductor coil. The method may also include placing one or more sensors around the circumference of a structure in the well formation, wherein the structure is magnetized by the permanent magnet, and detecting magnetic flux leakage from the structure via the one or more sensors.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

Figure 1:
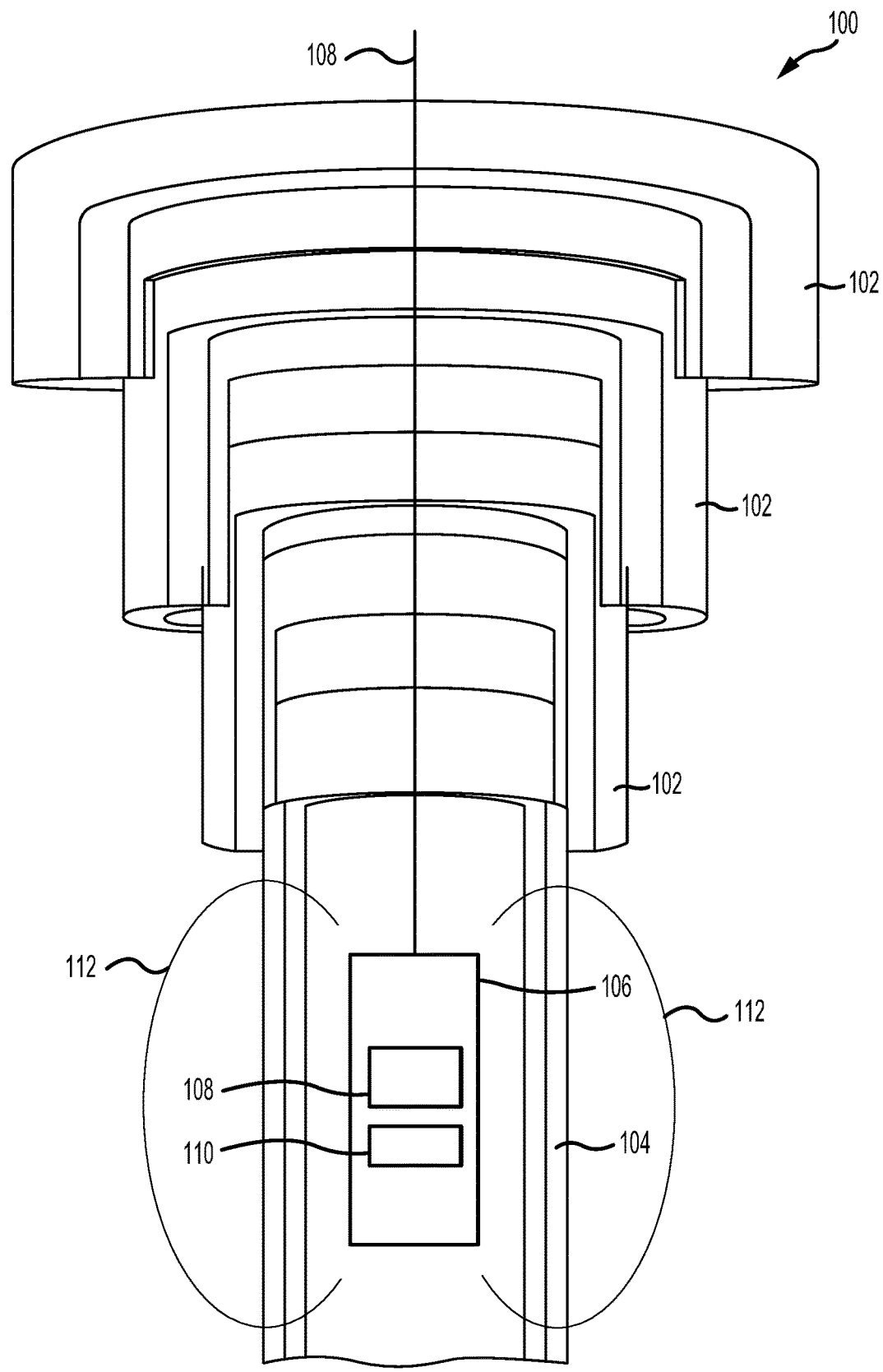
FIG. 1 illustrates a cross-sectional elevation view of an embodiment of a wellbore system, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

In various embodiments, like components may be referred to with the same reference numerals throughout the specification. However, in certain embodiments, different reference numerals may be used for clarity. Additionally, components of a similar nature may be referred to with a reference numeral and a letter, such as A and B, for clarity, and should not be construed as limiting. For example, while similar components may be referred to with reference numerals and an associated A and B, there components may have different sizes, shapes, or different operational mechanisms.

Embodiments of the present disclosure include systems and methods for performing transient electromagnetic logging with low power consumption. As discussed, previous transient electromagnetic techniques utilize electromagnets which allow for polarity switching, but also require a current to be constantly applied to maintain the magnetization of the electromagnet. The presently disclosed systems and methods provide for a switchable permanent magnet, which only requires a very short pulse of current to switch the polarity of the magnet and does not require any power to maintain that magnetization between switching. Thus, the total power consumption of the evaluation tool is significantly decreased.

FIG. 1 is a partial cross-sectional view of a well integrity inspection system, illustrating a well formation 100, including one or more structures surrounding a wellbore. The well formation 100 may include structures such as tubing, casing, cement layers, and earth. Specifically, in some embodiments, the well formation 100 may be formed into the earth and include an internal production pipe 104, a series of cylindrical metal casings 102, and cement wall layers between the casing layers 102. In some embodiments, the well 100 may not include all of these structures. For example, the well may not be cased and thus not include casing or cement wall layers. The well 100 may be any type of well, including but not limited to conventional and unconventional hydrocarbon producing wells. The well 100 may be a surface well or a subsea well.

An evaluation tool 106 may be deployed downhole into the well 100 to perform various logging functions and collect data on the well formation 100. In various embodiments, the evaluation tool 106 is a transient electromagnetic evaluation tool that can be used to determine electrical properties of the well formation 100. The evaluation tool 106 includes a transmitter portion for generating excitations signals and a receiver portion for measuring signals induced by the excitation signals. More specifically, the evaluation tool 106 generates a transient magnetic field in the well formation 100, inducing eddy currents in the well formation. The eddy currents induce an electromagnetic signal, which is detected by the receiver, and the detected electromagnetic signal contains information about the well formation 100. In various embodiments, the evaluation tool 106 includes a permanent magnet, and the transient magnetic field is generated when the polarity of the permanent magnet is abruptly reversed. The transient magnet field begins to decay after the polarity is reversed, during which the measurement can be made. The polarity of the permanent magnet can be switched back and forth at a specified rate during a logging operation. In various embodiments, the polarity of the permanent magnet is reversed when a high amplitude pulse of current is applied to a conductor coil positioned relative to the permanent magnet to induce the magnetization direction of the permanent magnet. The short pulse of current has a high enough amplitude to momentarily demagnetize the permanent magnet and then re-magnetize the permanent magnet when the current is removed or decreased. The magnetization of the permanent magnet remains constant after the current is removed. The direction in which the permanent magnet is re-magnetized depends on the polarity of the current. The polarity of the applied current is chosen such that the permanent magnet is re-magnetized to the opposite polarity it was before the current was applied. Thus, to switch the polarity of the magnet back and forth, the pulses of current are applied with alternating polarity.

In various embodiments, the permanent magnet is selected or configured to have a magnetization strength less than the magnetization saturation of the target structure. For example, if the evaluation system is used to evaluate the internal pipe 104 of the well formation, the permanent magnet may have a magnetization strength below the magnetic saturation of the internal pipe 104. If the evaluation tool is used to evaluate an outer pipe 102 with an inner pipe layer (e.g., internal pipe 104) situated between the outer pipe 102 and the permanent magnet, then the magnetization strength of the permanent magnet may be selected or configured to exceed the magnetic saturation of the internal pipe 104 and be lower than the magnetic saturation of the outer pipe 102. Thus, the inner pipe 104 essentially becomes "transparent" to the magnetic field, and the collected measurements will be attributed to the outer pipe. In this or similar fashions, the evaluation tool may be used to inspect individual structures in wells having any number of structures and layers.

The evaluation tool 106 may be a part of a work string 108. The work string 108 may be conveyed into the wellbore from a surface location. In various embodiments, the work string 108 includes a conveying member, such as an electric wireline, and the evaluation tool 106 may be attached to the bottom end of the wireline. In the illustrated embodiment, the evaluation tool is arranged in a vertical portion of the wellbore, however it should be appreciated that the evaluation tool may also be deployed in substantially horizontal or deviated segments of the wellbore. In some example embodiments, the wireline 108 may include an armored cable that includes conductors for supplying electrical energy (power) to downhole devices and communication links for providing two-way communication between the evaluation tool 106 and surface devices. In aspects, a processor, such as a microprocessor, a storage device, such as a memory device, and programs and instructions, may be utilized in and with the evaluation tool 106 to facilitate the functions of the evaluation tool 106. The evaluation tool 106 may include various other sensors, measurement devices, communication devices, and the like for carrying out these and other purposes and features of the evaluation tool 106.

Figure 2:
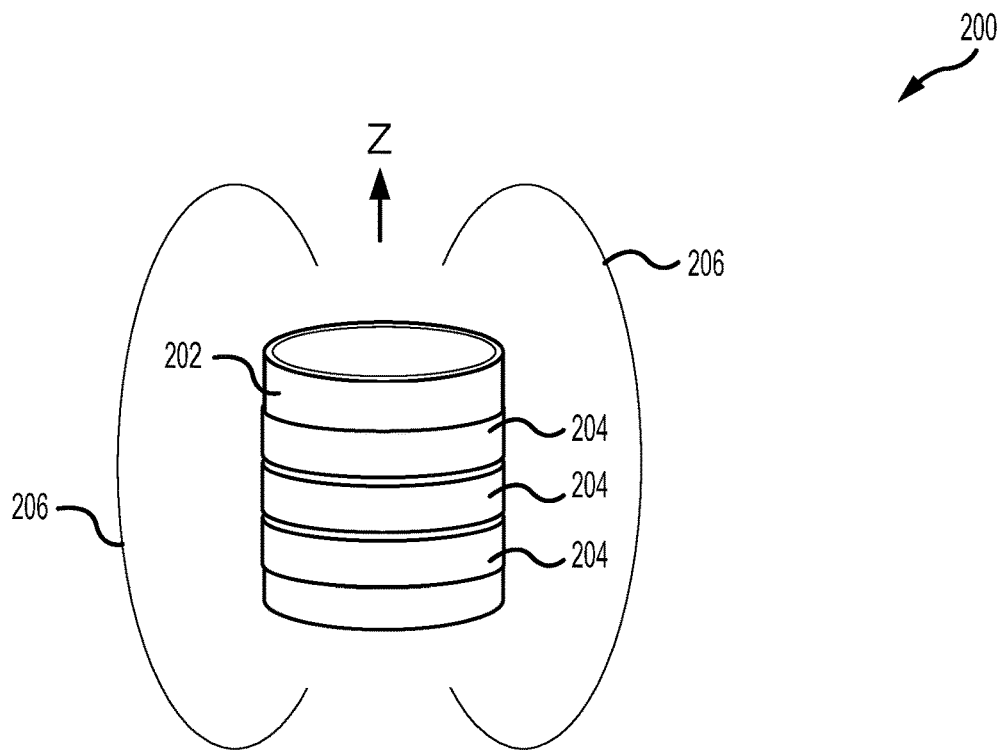
FIG. 2 illustrates an embodiment of a coil configuration of a transient electromagnetic wellbore evaluation tool, in accordance with embodiments of the present disclosure.
Figure 3:
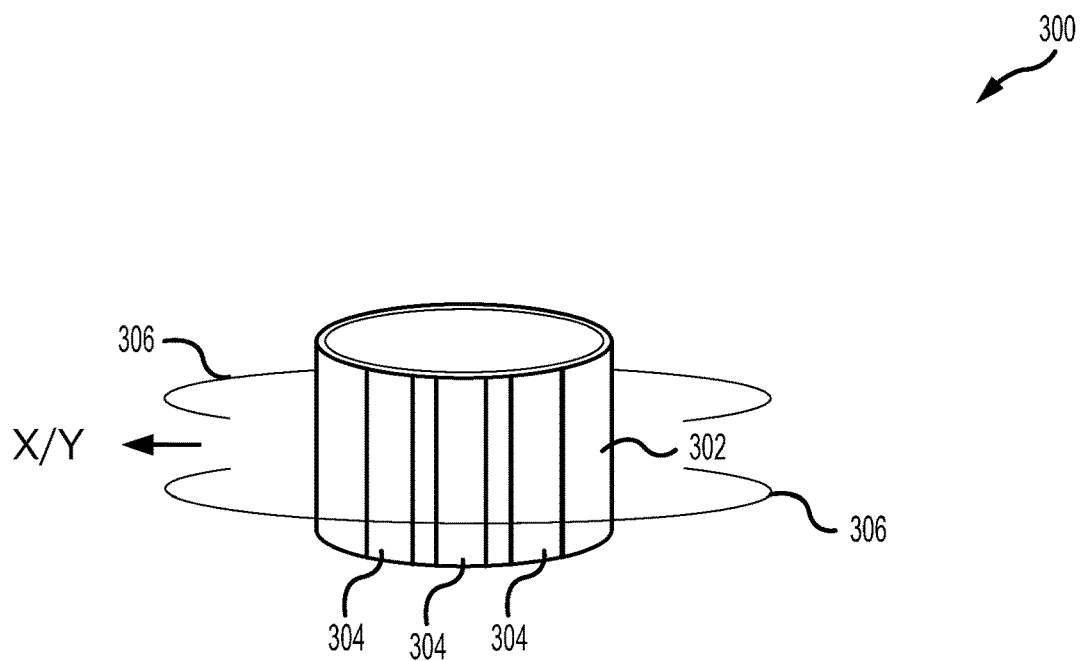
FIG. 3 illustrates another embodiment of a coil configuration of a transient electromagnetic wellbore evaluation tool, in accordance with embodiments of the present disclosure.

FIG. 2 illustrates an embodiment of a permanent magnet and coil configuration 200 for a downhole evaluation tool, in accordance with embodiments of the present disclosure. Specifically, FIG. 2 illustrates an embodiment of the permanent magnet 202 and coil 204 for generating a longitudinal (i.e., axial) magnetic field 206. Thus, when the evaluation tool is downhole, the magnetic field is oriented in the axial direction (Z) and longitudinal with respect to the wellbore FIG. 3 illustrates another embodiment of a permanent magnet and coil configuration 300 for the downhole evaluation tool, in accordance with embodiments of the present disclosure. Specifically, FIG. 3 illustrates an embodiment of a permanent magnet 302 and coil 304 for generating a transverse magnetic field 306. Thus, when the evaluation tool is downhole, the magnetic field is oriented in the transverse direction (X or Y, depending on the orientation) with respect to the wellbore. In some embodiments, the evaluation tool may include more than one magnet configured to generate multiple magnetic fields and in different orientations. For example, the evaluation tool may include permanent magnets to generate both an axial magnetic field and a transverse magnetic field. The permanent magnet may be any type of material with intrinsic magnetic properties, and able to retain magnetism and generate a substantially steady magnetic field without being powered. The conductor coil may be positioned in various other ways other than the two example shown in FIGS. 2 and 3. For example, the coil 406 may be wrapped around the permanent magnet, embedded within the permanent magnet, or otherwise positioned in proximity to the permanent magnet to be able to induce demagnetization and re-magnetization of the permanent magnet.

Figure 4A:
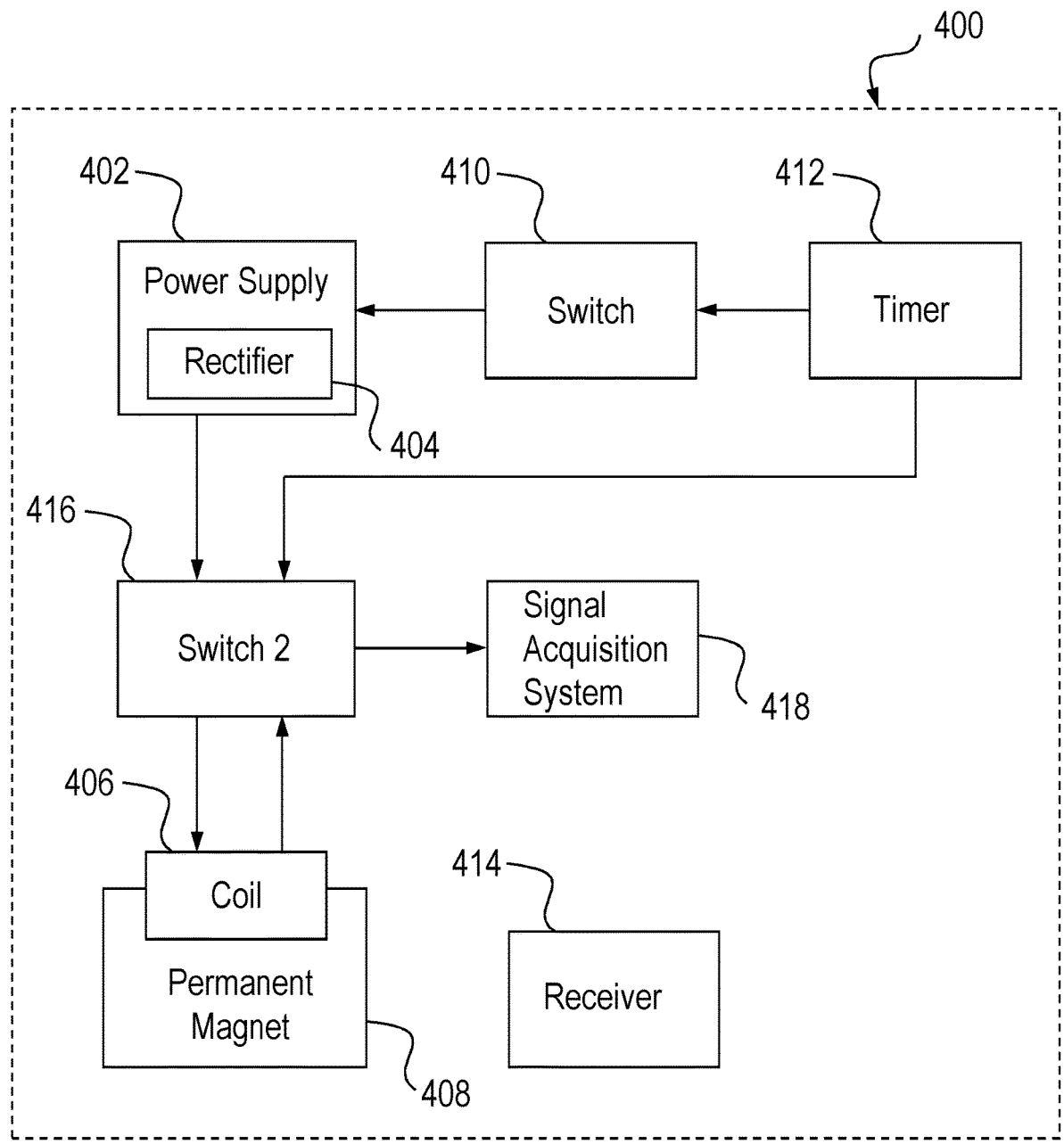
FIG. 4A is a block diagram representation of a wellbore evaluation system, in accordance with embodiments of the present disclosure.

FIG. 4A is a block diagram representation of a wellbore evaluation system 400, in accordance with embodiments of the present disclosure. In various embodiment, a system for performing downhole logging operations includes a power supply 402 for providing a current and a conductor coil 406 electrically coupled to receive the current from the power supply 402. The system 400 further includes a permanent magnet 408 coupled to the conductor coil 406. For example, the coil 406 may be wrapped around the permanent magnet 408, embedded within the permanent magnet 408, or otherwise positioned in proximity to the permanent magnet 408 to be able to induce demagnetization and re-magnetization of the permanent magnet 408. In some embodiments, the conductor coil 406 may be wrapped around the magnet in various configurations and variable number of loops. The permanent magnet 408 may be any type of material with intrinsic magnetic properties, and able to retain magnetism and generate a substantially steady magnetic field without being powered.

In some embodiments, the current supplied to the conductor coil 406 is a direct current (DC). The power supply 402 may include or is coupled to a rectifier 404, the rectifier 404 rectifying a received current into a direct current for supplying through the conductor coil 406. In various embodiments, the permanent magnet 408 may be selected based on the intended application of the system 400, such as the evaluation target. Specifically, as described above, the evaluation system 400 may be used to make measurement of a target structure of a well formation. Thus, the permanent magnet 408 is selected or configured to have a magnetization strength less than the magnetization saturation of the target structure. For example, if the evaluation system is used to evaluate an internal pipe of the well formation, the permanent magnet 408 may have a magnetization strength below the magnetic saturation of the internal pipe. If the evaluation system 400 is used to evaluate an outer pipe with an inner pipe layer situated between the outer pipe and the permanent magnet, then the magnetization strength of the permanent magnet 408 may be selected or configured to exceed the magnetic saturation of the inner pipe and be lower than the magnetic saturation of the outer pipe. Thus, the inner pipe essentially becomes "transparent" to the magnetic field, and the collected measurements will be attributed to the outer pipe.

The system further includes a switch 410 electrically coupled to the power supply 402 for controlling current provided to the conductor coil 406. The switch 410 controls the power supply 402 to apply current in short pulses to switch the polarity of the permanent magnet 408, and keeps the current off in between pulses. In some embodiments, current is applied during "on" durations and turned off during "off" durations. In various embodiments, the "off" durations are significantly longer than the "on" duration. For example, one pulse of current may be applied approximated every second, with each "on" duration lasting only approximately 10 microseconds and no power being applied to the permanent magnet for each remaining "off" duration. When the polarity of the permanent magnet 408 is switched, a transient magnetic field may be induced in a nearby or surrounding formation or structure. In order to switch the polarity of the permanent magnet 408, the applied current has a large enough amplitude to generate a magnetic field exceeding the permanent magnet's existing magnetization. In some embodiments, the applied current may have high enough amplitude to bring the permanent magnet to or beyond its Curie point, thereby momentarily causing the permanent magnet to lose its previous magnetization and allowing it to be re-magnetized based on the polarity of the applied current. Thus, to switch the polarity of the magnet, the applied current has a polarity that will allow the permanent magnet become re-magnetized in the intended polarity. For example, in order to switch the polarity of the magnet with each excitation current, the polarity of the applied current is also switched for each excitation.

In some embodiments, the system 400 may include a timer 412 coupled to or included in the switch 410. The timer may be programmed to activate the switch based on a programmed activation rate or a control signal. In some embodiments, a processor, such as a microprocessor, a storage device, such as a memory device, and programs and instructions, may be utilized in and with the system 400 to facilitate the functions of the system. The system 400 may include various other sensors, measurement devices, communication devices, and the like for carrying out these and other purposes and features of the system 400.

The system further includes a receiver 414 detecting an electromagnetic signal caused by eddy currents in a surrounding environment induced by the transient magnetic field. The switching of the polarity of the permanent magnet 408 may induce a transient magnet field in a nearby or surrounding formation or structure. The transient magnet field begins to decay after the polarity switching, which may induce eddy currents in the formation or structure. The eddy currents then generate an electromagnetic signal, which can be detected by the receiver and used to form data regarding the formation or structure. In some embodiments, the receiver 414 may include an antenna such as a coil for detecting electromagnetic signals.

Figure 4B:
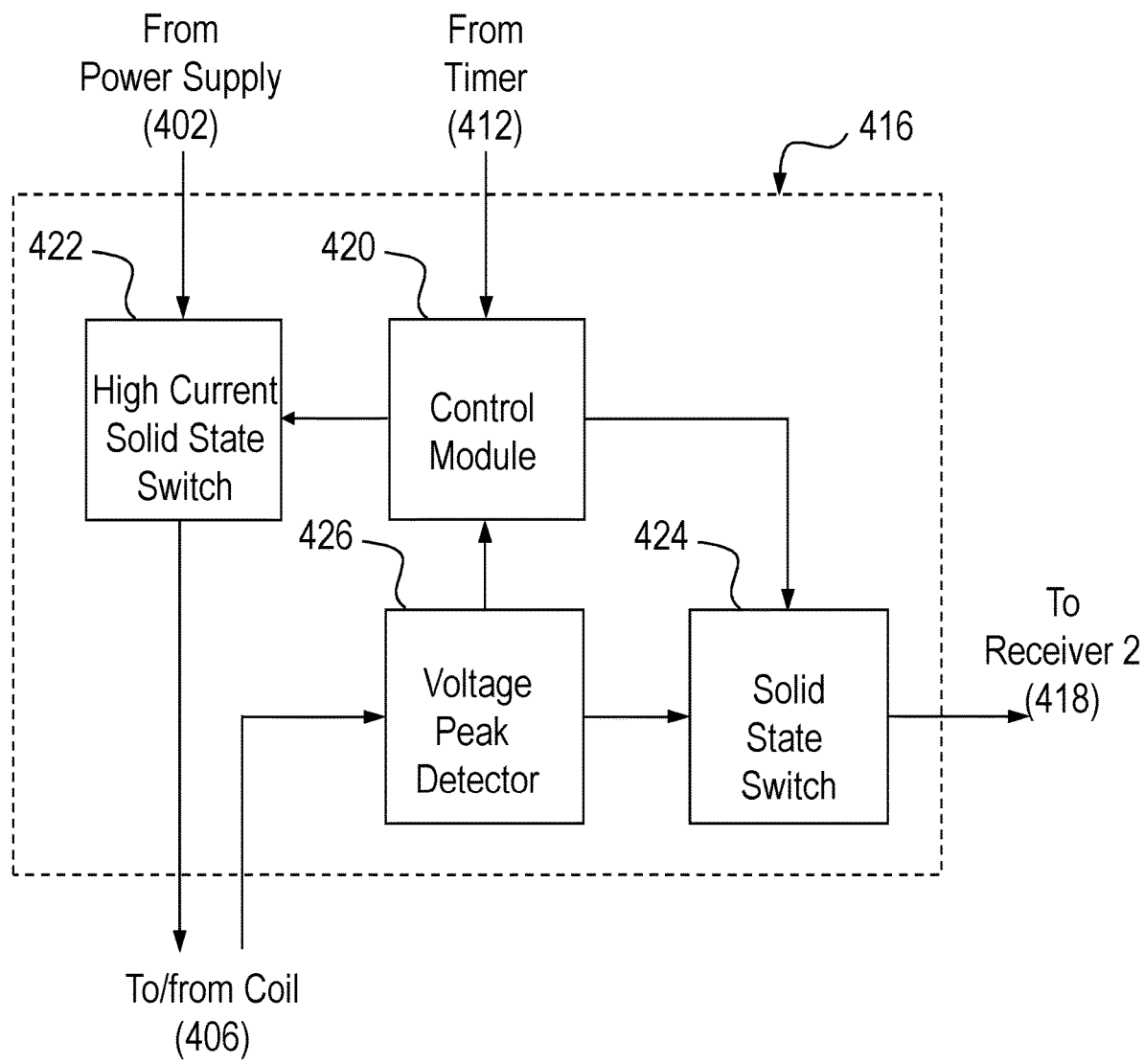
FIG. 4B is a block diagram representation of a switching mechanism of the wellbore evaluation system, in accordance with embodiments of the present disclosure.

In some embodiments, the system 400 may include a multi-state switch 416 that conducts through when closed and does not conduct when open. In some embodiments, the multi-state switch 416 may be a two-state switch, a three-state switch, a bi-directional switch, among others. The multi-state switch 416 enables coil 406 to sequentially operate as a source of magnetic field that re-magnetizes the permanent magnet 408 and also as a primary sensor of the electromagnetic signal caused by eddy currents in a surrounding environment induced by the transient magnetic field. FIG. 4B is block diagram of the multi-state switch 416, and illustrates connections to the block diagram of the larger system illustrated in FIG. 4A. The multi-state switch 416 may be operated by the timer 412 through a control module 420. The operational sequence may be as follows: (a) Open a solid-state switch 424 to signal acquisition system 418. No coil voltage is applied to the input of signal acquisition system 418 while the solid-state switch 424 is open. (b) Close a high current solid-state switch 422 after opening the solid-state switch 424. In some embodiments, there may be a small delay (e.g., 100 microseconds) between opening the solid-state switch. (c) Enable operation of switch 410, and switched off after re-magnetization of magnet 408. In some embodiments, this may be for a short duration to provide a pulse of current. (d) After the short duration (i.e., after the current is removed), timer 412 opens the high current solid-state switch 422, and then sends a command to the solid-state switch 424 to close. The short duration is the time required to diminish the voltage spike across coil 406 induced by the change of magnetic state of the permanent magnet 408. For example, this duration may be 80-100 microseconds. (e) The control module 420 closes the solid-state switch 424 if the voltage peak detector 426 indicates that the voltage across coil 406 is below the safety threshold level of the input electronics of signal acquisition system 418. (f) Components return to their initial state per timer 412 upon the end of acquisition of the response from the surrounding environment. In some embodiments, receiver 414 is an additional electromagnetic sensor and may include at least one of a magnetometer, a second conductive coil, an electrode system, a Hall effect sensor, or a giant magnetic resistivity sensor.

Figures 5A, 5B, 5C:
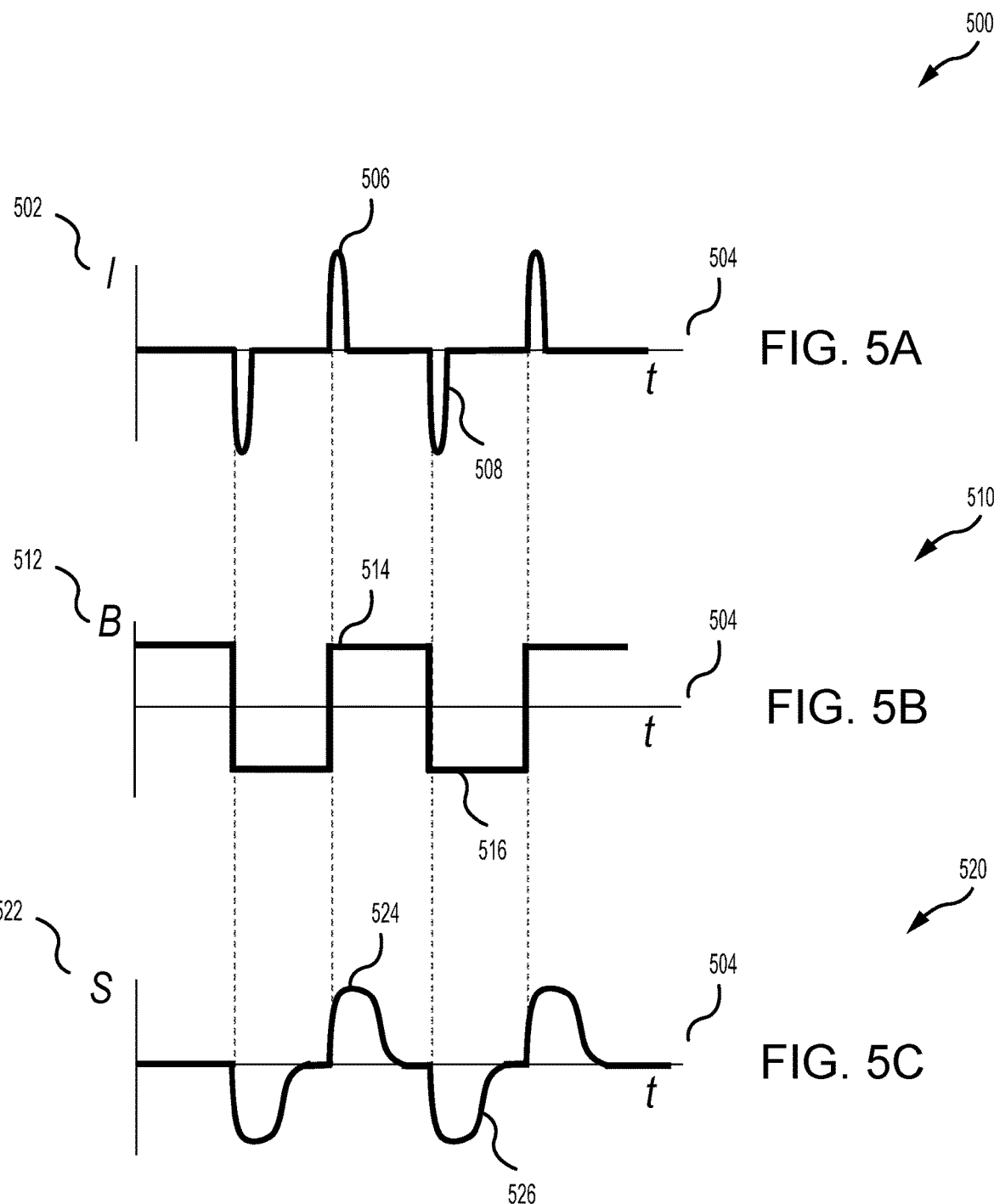
FIG. 5A is a graph representing an excitation current applied a permanent magnet of a wellbore evaluation tool with respect to time, in accordance with embodiments of the present disclosure.
FIG. 5B is a graph representing a magnetization of the permanent magnet of the wellbore evaluation tool with respect to time, in accordance with embodiments of the present disclosure.
FIG. 5C is a graph representing a transient voltage signal induced in a receiver by the conductor coil and the permanent magnet of the wellbore evaluation tool, as well as the eddy currents, with respect to time, in accordance with embodiments of the present disclosure.

FIGS. 5A, 5B, and 5C are graphs illustrating a well evaluation scenario sharing a common time domain. Specifically, FIG. 5A is a graph 500 representing an excitation current 502 applied a permanent magnet of a wellbore evaluation tool with respect to time 504, in accordance with embodiments of the present disclosure. FIG. 5B is a graph 510 representing a magnetization 512 of the permanent magnet of the wellbore evaluation tool with respect to time 504, in accordance with embodiments of the present disclosure. FIG. 5C is a graph 520 representing a transient magnetic field 522 induced by the permanent magnet of the wellbore evaluation tool with respect to time 504, in accordance with embodiments of the present disclosure. In this example, as illustrated in FIG. 5A, a current pulse 506 of a first polarity is applied at $t_{S1}$. The current is applied as a very short pulse (e.g., lasting 10 microseconds). Thus, in some embodiments, the duration of the applied current may be considered an instantaneous pulse. After the pulse 506, the current or power supplied is 0. Referring to FIG. 5B, at substantially $t_{S1}$, when the pulse of current is applied, the magnetization polarity is reversed. Once the magnetization polarity is reversed, the magnetization 514 remains constant even when the power is off and there is no current. Referring to FIG. 5C, once the magnetization polarity is reversed, a transient magnetic field 524 is induced and begins to decay. Measurements are made during this period. Referring to FIG. 5A, subsequently, another current pulse 508 may be applied at $t_{S2}$. The subsequent current pulse 508 applied at $t_{S2}$ has the opposite polarity as the previous current pulse 506 applied at $t_{S1}$. Thus, referring to FIG. 5B, when the subsequent current pulse 508 is applied, the magnetization 504 is again reversed and remains constant until another current pulse is applied. Referring to FIG. 5C, when the magnetization is reversed at $t_{S2}$, another transient magnetic field 526 is induced and begins to decay. The transient magnetic field 526 also has the opposite polarity as the previously induced transient magnetic field 524. Thus, more measurements can be made during this period.

Referring to FIG. 5B, at substantially $t_{S1}$, when the pulse of current is applied, the magnetization polarity is reversed. Once the magnetization polarity is reversed, the magnetization 514 remains constant even when the power is off and there is no current. In some embodiments, this constant magnetization of the magnet may be used to magnetize the pipe being inspected. In every measurement cycle, once the transient magnetic field 524 or the reversed polarity transient magnetic field 526 have decayed to a negligible level, direct magnetic flux measurements close to the pipe wall may be used to indicate magnetic flux leakage and, thereby, flaws and other features in the pipe wall. The magnetic flux measurements may be performed by an array of sensors located around the circumference inside the pipe being inspected. The magnetic flux may be measured at each sensor location in one or more dimensions. Magnetic flux leakage (MFL) is a different pipe evaluation modality that works in the quasi-static regime as opposed to the transient measurements. Being able to do both of the measurement types described above using the same system is a significant advantage.

Figure 6:
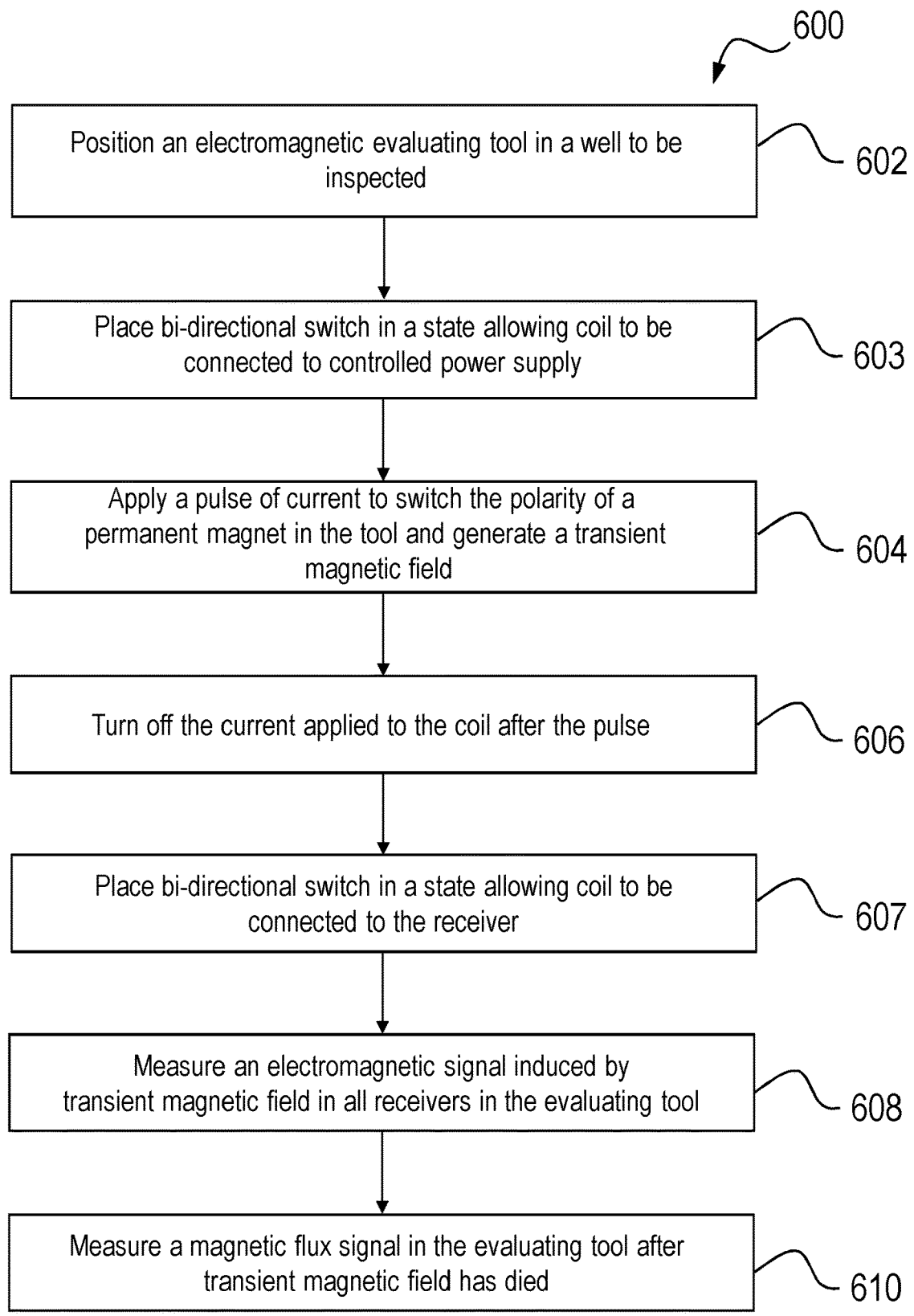
FIG. 6 is a flowchart representing an example method of well evaluation, in accordance with embodiments of the present disclosure.

FIG. 6 is a flowchart representing an example method of well evaluation, in accordance with embodiments of the present disclosure. It should be appreciated for this method and all methods described herein that the steps may be performed in any order, or in parallel, unless otherwise explicitly stated. Moreover, there may be more or fewer steps and certain steps may be omitted, in certain embodiments. In this example of a method of evaluating a well, an evaluation tool is positioned (block 602) in a well to be inspected. Specifically, the evaluation tool may be placed downhole in the wellbore surrounded by a well formation. The well formation may include pipes, casing, concrete layers, and earth, among any other structures related to the well. The evaluation tool may include a permanent magnet and a conductive coil electrically coupled to a power supply, in which the polarity of the permanent magnet is switchable by applying a high enough current through the conductive coil from the power supply.

The evaluation tool may be used to make measurement of a target structure of the well formation, and the permanent magnet has a magnetization strength less than the magnetization saturation of the target structure. For example, the evaluation tool may be used to evaluate an internal pipe of the well formation. In this application, the permanent magnet may be selected or configured to have a magnetization strength below the magnetic saturation of the internal pipe. The evaluation tool may also be used to evaluate multi-barrier structures. For example, the target structure may be an outer pipe with an inner pipe layer situated between the outer pipe and the evaluation tool. In this application, the magnetization strength of the permanent magnet may be selected or configured to exceed the magnetic saturation of the inner pipe and be lower than the magnetic saturation of the outer pipe. Thus, the inner pipe essentially becomes "transparent", and the collected measurements will be attributed to the outer pipe. In some embodiments, the evaluation tool may be a part of a logging tool such as a wireline logging tool. It may also be a part of a drill string for logging while drilling applications.

A multi-state switch is placed (block 603) is placed in a position or state in which the conductive coil is electrically coupled to the power supply. In order to generate an excitation signal to induce a transient magnetic field in the well formation, a pulse of current is applied (block 604) through the coil from the power supply to switch the polarity of the permanent magnet. When the polarity is switched, a transient magnetic field may be induced in the well formation. The applied current has an amplitude large enough to generate a magnetic field exceeding the permanent magnet's existing magnetization. In some embodiments, the applied current may have high enough amplitude to bring the permanent magnet to or beyond its Curie point, thereby momentarily causing the permanent magnet to lose its previous magnetization and allowing it to be re-magnetized based on the polarity of the current. Thus, to switch the polarity of the magnet, the applied current has a polarity that will allow the permanent magnet become re-magnetized in the intended polarity. For example, in order to switch the polarity of the magnet with each excitation, the polarity of the applied current is also switched for each excitation. Further, for each excitation, the current is applied for a very short duration, or "on" duration to reverse the polarity of the permanent magnet. In some embodiments, the "on" duration is only as long as is needed to reverse the polarity of the permanent magnet.

After the polarity of the permanent magnet is reversed, the current applied to the permanent magnet is turned off (block 606) for an "off" duration. The "off" duration, during which power is not applied to the permanent magnet, is typically longer than the "on" duration, during which power is applied. For example, in some embodiments the "off" duration may last at least ten times as long as the "on" duration, or pulse. The multi-state switch is then placed (block 607) in a position or state in which the conductive coil is electrically coupled to a receiver (i.e., signal acquisition system). This allows the coil to sense the eddy currents induced in the formation. Specifically, when during the "off" duration, the transient magnet field decays and eddy currents are induced in the formation by the transient magnetic field. The eddy currents cause an electromagnetic signal, which is measured (block 608) and used to form the logging (e.g., well evaluation) data. In some embodiments, additional measurements may be made either in the same position or at another position in the wellbore by applying another current to the permanent to again reverse its polarity to generate another transient magnetic field. In some embodiments, the pulses of current can be applied at a predetermined rate. For example, one pulse of current may be applied approximated every second, with each "on" duration lasting only approximately 10 microseconds and no power being applied to the permanent magnet for each remaining "off" duration.

The analysis below illustrates an example of the power savings achieved using an embodiment of the present disclosure. Consider a conventional electromagnet for generating a dipole moment $p_m$=500 Am$^2$. The conventional electromagnet would consist of N turns of copper wire around a core of soft magnetic material such as ferrite. Let the length of the core be l=1 m, and cross-section area of the core be s=0.006 m$^2$. Let the effective susceptibility of the core be $\chi_{eff}$=150. Let an electric current 1 flow in the coil. Then the applied external magnetic field on the core is given by $$H_e = I \frac{N}{l}.$$

The magnetization of the core is given by $$M = \chi_{Eff} H_e.$$

The dipole moment is given by $$p_m = Msl = \chi_{eff} H_e sl = \chi_{eff} INs.$$

The conventional electromagnet is typically turned on and off using a switch. Let the switching time be $\tau_{sw}$=5 µs. Then, the maximum voltage across the coil is given by $$V_{max} = L\frac{dI}{dt}\bigg|_{max} \approx L\frac{2I}{\tau_{sw}}$$

where L is the coil inductance given by $$L \approx \mu_0 \chi_{eff} \frac{N^2 s}{l}.$$

Using the above equations, the current in the coil can be derived as $$I = \frac{2\mu_0 p_m^2}{\chi_{eff} \tau_{sw} s l V_{max}}.$$

The power losses associated with the above current are the loss in the antenna coil wire (negligible for a low inductance coil) and the loss due to finite conductivity of the switch in the conductive state. Further, since the switching phase is much shorter than the steady-state on-state, the power losses during the switching phase can be neglected. Thus, the power requirement for the conventional electromagnet is given by $$P_{electromagnetic} \approx V_{on} I \eta$$

where $V_{on}$ is the on-state voltage of the switch and $\eta$ is the duty-cycle (on-state/total period). The following practical numbers are used for the current and power calculations: dipole moment $p_m$=500 Am$^2$, core length l=1 m, core cross-section area s=0.006 m$^2$, effective susceptibility of the core $\chi_{eff}$=100, switching time $\tau_{sw}$=5 µs, maximum voltage $V_{max}$=1000 V, on-state voltage (for the Advanced Power Technology IGBT APT75GP120B2 as an example of a solid-state switch) $V_{on}$=3.9 V, and duty-cycle $\eta$=0.5. This results in $$I \approx 209 \text{ Amp}$$

$$P_{electromagnet} \approx 408 \text{ W}.$$

Turning now to the effects of the techniques of the present disclosure, consider a switchable permanent magnet, in accordance with various embodiments, in which the power losses exist only during switching the polarity of the magnetic dipole. During the long steady-state phase, the dipole moment is maintained by the residual magnetization of the magnetic core. For a simplified ideal hysteresis loop (M=±M$_s$@H=0 and H=±H$_c$@M=0, where M$_s$ is the saturation magnetization and H$_c$ is the coercive force), $$p_m = 2M_s sl = 2\frac{B_s}{\mu_0}sl.$$

Assuming B$_s$=1 T and p$_m$=500 Am$^2$ (same as in the conventional magnet scenario above), and assuming l=1 m, this results in s=0.0003 m$^2$ and M$_s$=800 kA/m. The coercive force is given by $$H_c \geq \frac{M_s}{\chi_{eff}}\bigg|_{max}.$$

Assuming $\chi_{eff}$=100, this results in H$_c$=8 kA/m. Then the minimum energy expended while switching the polarity of the switchable permanent magnet is given by $$E = 2\mu_0 M_s H_c sl.$$

The results in E=4.8 J. Then the power consumption is given by $$P_{switchable\ magnet} = \begin{cases} 4.8\ W & \text{if switching rate: 1/sec} \\ 48\ W & \text{if switching rate: 10/sec} \\ 480\ W & \text{if switching rate: 100/sec} \end{cases}$$

Comparing $P_{switchable\ magnet}$ to $P_{electromagnet}$, it is apparent that the switchable permanent magnet yields significant power savings over the electromagnet provided the switching rate is low enough.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for performing downhole logging operations, the system comprising:
 a conductor coil configured to alternate between producing a magnetic field and measuring a magnetic field induced in a formation;
 a power supply couplable to the conductor coil for providing an electrical control current to conductor coil;
 a signal acquisition system couplable to the conductor coil;
 a permanent magnet coupled to the conductor coil;
 a multi-state switch operable in a first state and a second state,
 wherein in the first state, the conductor coil is coupled to an output of the power supply and decoupled from an input of the signal acquisition system; and
 wherein in the second state, the conductor coil is coupled to the input of the signal acquisition system and decoupled from the output of the power supply; and
 at least one electromagnetic sensor detecting an electromagnetic signal caused by eddy currents in the surrounding environment induced by a transient magnetic field;
 wherein the electrical control current supplied to the conductor coil from the power supply during the first state of multi-state switch has an amplitude large enough to generate a magnetic field exceeding the permanent magnet's existing magnetization.

2. The system of claim 1, further comprising a timer coupled to the multi-state switch, the timer activating the multi-state switch to change the states based on a programmed activation rate or a control signal.

3. The system of claim 1, wherein a duration of the first state of the multi-state switch and the corresponding control current flowing through the conductive coil is shorter than a duration of the second state during which the control current is absent.

4. The system of claim 1, wherein the control current supplied to the conductor coil from the power supply during the first state of the multi-state switch causes the permanent magnet to reverse polarity and induces the transient magnetic field in the surrounding environment.

5. The system of claim 1, wherein the flow of the control current supplied to the conductor coil from the power supply has an opposite direction of flow during each sequential time the multi-state switch is in the first state, thereby sequentially reversing polarity of the permanent magnet.

6. The system of claim 1, wherein switching the multi-state switch to the second state upon completion of the first state enables the conductor coil to operate as a magnetic field sensor that records induced voltage by the means of the signal acquisition system.

7. The system of claim 1, wherein the at least one additional electromagnetic sensor comprises at least one of a magnetometer, a second conductive coil, an electrode system, a Hall effect sensor, or a giant magnetic resistivity sensor.

8. The system of claim 1, further comprising one or more sensors located around the circumference of a pipe under inspection, wherein the pipe is magnetized by the permanent magnet and the one or more sensors detect magnetic flux leakage from the pipe.

9. The system of claim 1, wherein the permanent magnet has a magnetization strength below the magnetic saturation of a structure in the surrounding environment.

10. The system of claim 1, wherein the permanent magnet has a magnetization strength exceeding the magnetic saturation of a first structure in a surrounding environment and below the magnetic saturation of a second structure in the surrounding environment.

11. A system for performing downhole logging operations, the system comprising:
 a conductor coil;
 a permanent magnet having a permanent magnet magnetic field and coupled to the conductor coil;
 a power supply selectively couplable to the conductor coil for providing a current to conductor coil;
 a signal acquisition system selectively couplable to the conductor coil for receiving a measurement signal from the conductor coil; and
 a switching device configured to alternating couple the conductor coil to either the power supply or the signal acquisition system,
 wherein when the conductor coil is coupled to the power supply, the power supply provides a current through the conductor coil causing the conductor coil to generate a conductor coil magnetic field, wherein the conductor coil magnetic field is substantially parallel to the permanent magnet magnetic field; and
 wherein when the conductor coil is coupled to the signal acquisition system, the conductor coil detects a magnetic field induced in a formation.

12. The system of claim 11, further comprising a timer coupled to the switching device, the timer controlling the switching device based on a programmed activation rate or a control signal.

13. The system of claim 11, wherein the conductive coil is coupled to the power supply for a shorter duration than the conductive coil is coupled to the signal acquisition system.

14. The system of claim 11, wherein the flow current supplied to the conductor coil from the power supply has an opposite direction of flow during each sequential time the conductive coil is coupled to the power supply, thereby sequentially reversing polarity of the permanent magnet.

15. The system of claim 11, further comprising one or more sensors located around the circumference of a pipe under inspection, wherein the pipe is magnetized by the permanent magnet and the one or more sensors detect magnetic flux leakage from the pipe.

16. A method for evaluating a well comprising:
 placing an evaluation tool in a wellbore surrounded by a well formation, the evaluation tool comprising a permanent magnet, a conductor coil, a power supply, and a signal acquisition system;

electrically coupling the conductor coil to the power supply, thereby energizing the conductor coil and reversing the polarity of the permanent magnet and generating a transient magnetic field in the well formation;

electrically decoupling the conductor coil from the power supply;

electrically coupling the conductor coil to the signal acquisition system, the conductor coil sensing an electromagnetic signal caused by eddy currents in the formation induced by the transient magnetic field;

electrically decoupling the conductor coil from the signal acquisition system; and electrically coupling the conductor coil to the power supply.

17. The method of claim 16, further comprising:

controlling switching between coupling the conductor coil to the power supply and the signal acquisition system using a timer programmed based on a predetermined switching schedule.

18. The method of claim 16, wherein the signal acquisition system is coupled to the conductor coil for a longer duration than the power supply is coupled to the conductor coil.

19. The method of claim 16, further comprising:

placing one or more sensors around the circumference of a structure in the well formation, wherein the structure is magnetized by the permanent magnet; and detecting magnetic flux leakage from the structure via the one or more sensors.

* * * * *